MAGNETIC PRISMS USED FOR SEPARATING IONIZED PARTICLES

Filed May 29, 1957 6 Sheets-Sheet 1

July 12, 1960 H. BRUCK ET AL 2,945,125

MAGNETIC PRISMS USED FOR SEPARATING IONIZED PARTICLES

Filed May 29, 1957 6 Sheets-Sheet 4

United States Patent Office 2,945,125

Patented July 12, 1960

2,945,125

MAGNETIC PRISMS USED FOR SEPARATING IONIZED PARTICLES

Henri Bruck, Paris, and Gabriel Gendreau and Marcel Salvat, Bures-sur-Yvette, France, assignors to Commissariat a l'Energie Atomique, Paris, France, a society of France Filed May 29, 1957, Ser. No. 662,525

Claims priority, application France May 30, 1956

5 Claims. (Cl. 250—41.9)

It is known to separate ionized particles having different masses, charges or energies (velocities) by means of apparatus, such as mass spectrometers or spectrographs, which include the following elements:

A source capable of projecting a beam of ionized particles through a vacuum chamber;

A device, hereinafter called "magnetic prism," intended to create in said chamber a magnetic field which causes the particles to travel along curvilinear (semi-circular) orbits or trajectories; and A collector receiving the particles at the end of their trajectory.

It is also known that the trajectories of particles having the same characteristics (for instance of the same mass) are focussed at the collector on areas or rays the relative positions of which depend upon the respective values of said characteristics, for instance of the masses of the particles.

For the same mean distance between rays, the finer the rays, the better the separation of the particles.

The appended Figs. 1 and 2 show the density of the particles in two adjacent rays, shown by plotting in abscissas the distances along the collector and in ordinates the density of the particles. In the case of Fig. 1, rays 1 and 2 are wide and overlap each other; in the case of Fig. 2, on the contrary, rays 3 and 4 are fine and well separated.

Widening of the rays and overlapping thereof at the collector are very serious drawbacks for the practical utilization of magnetic prisms intended to separate ionized particles and they have several causes, and in particular the two following ones:

The first cause lies in the fact that the ray (or image) undergoes displacements along the optical axis and is not constantly formed in the plane of the collector. These displacements are themselves due to the displacements of the object ("cross-over" of the source) which result from variations in the conditions of operation of the ion source and in the focussing by the extraction electrode. Besides, this focussing is influenced by the space charge as shown by Fig. 3.

Fig. 3 shows an ion source 5 with the ionic plasma 6, the extraction electrode 7 and the accelerating electrode 8. Due to the space charge, concentration of the rays issuing from source 5 does not take place at $A_1$ but at $A_2$ which thus constitutes a virtual object for the magnetic prism of the separator (not shown). This Fig. 3 shows that, according to the conditions of operation of the source and in particular to its ion output, the beam of particles 9 is more or less divergent and that the position of point $A_2$ may vary substantially.

Displacement of the object plane, whatever be the cause thereof, results in a spreading of the image ray. This is clearly visible on Figs. 4 and 5. On Fig. 4, the collector has been placed in the plane 10 conjugate of the object plane $A_2$ with respect to prism 11. In the case of Fig. 5, the object has moved toward the left into position $A'_2$ and the image rays are no longer focussed in the plane 10 of the collector.

The second cause of spreading of the rays at the collector is the coma aberration. Fig. 6 clearly illustrates this defect as a consequence of which, for particles having the same characteristics, the trajectories on either side of the mean orbit are too much curved. On Fig. 6 we have diagrammatically shown the mean trajectory 12 and the limit trajectories 13 and 14 of a beam of ionized particles having an angular divergence $\alpha$, said beam circulating in a magnetic sector, not shown, having a uniform induction $$\vec{B}$$

These three trajectories 12, 13 and 14 are, under the action of induction $$\vec{B}$$

which is perpendicular to the plane of the drawings, and in accordance with the known laws of mechanic, circumferential arcs of the same radius R. Their three centers are respectively at $O_{12}$, $O_{13}$ and $O_{14}$ and all the rays issuing from the same object point $A_2$ intersect, at the image end, a small segment 15 of a straight line, corresponding to the coma aberration of the magnetic prism that is considered. Its magnitude is equal to $R\alpha^2$ in this particular case.

To remedy these two defects of magnetic prisms, various solutions have already been suggested. However none of them is truly satisfactory.

In order to remedy the first defect, that is to say the widening of the rays due to the displacement of the object, it is customary to operate in either of two different ways:

Either by displacing the collector, so as to restore it into the image plane, for instance toward the left in the case of Fig. 5;

Or by modifying the conditions of operation of the source (electronic output, gaseous pressure, extraction and acceleration voltages), so as to keep the position of the object fixed in space.

The first solution is a very serious inconvenience for the person using the apparatus. The second one is not always compatible with the maximum efficiency of the source since it means adjusting parts of its parameters to values which may be unfavorable.

Due to the coma aberration (second defect), the orbits on either side of the mean orbit 12 (Fig. 6) are, as above stated, too much curved. It is therefore necessary to use the magnetic induction on either side of this mean orbit so that all the trajectories lead to the same image point.

In order to remedy this defect, it has been necessary, up to now, to correct the section of the input and output faces of the electro-magnet. This is a semi-empirical task which is extremely long (from one to two years).

The object of the present invention is to provide improvements in magnetic prisms which obviate the above mentioned drawbacks in a simple and an efficient manner.

These improvements are essentially characterized by the fact of applying, against the pole faces of the magnetic prism, correcting windings which create, as soon as a current is flowing therethrough, a modification of the main magnetic field capable of correcting the defects due to the displacement of the object along the optical axis and to the coma aberration.

Preferred embodiments of our invention will be hereinafter described with reference to the accompanying drawings given merely by way of example and in which:

Figs. 1 to 5, already referred to, are explanatory views relative to the state of the art.

The current densities capable of effecting the above stated corrections may be easily calculated. The corrections themselves are easily effected because they depend only upon the current densities in the correcting windings, which may be adjusted to the desired value by means of a mere rheostat.

The correcting windings are constituted, according to the invention, either by two distinct circuits which separately correct the defects due respectively to the displacement of the object along the optical axis and to the coma aberration, or by a single circuit which corrects one of these two defects exclusively of the other.

For a magnetic prism, the conjugate plane equation well known in geometrical optics remains true and can be written:

$$\text{(I)} \qquad \frac{1}{a}+\frac{1}{b}=\frac{1}{f}$$

with:

$a$—distance from the object to the main object plane,
$b$—distance from the image to the main image plane,
$f$—focal distance of the prism.

Equation I shows that if it is desired, according to the invention, to keep the position of the collector fixed when the object is moved, that is to say to keep distance $b$ constant when distance $a$ varies, it is necessary to vary also the focal distance $f$, according to the relation:

$$\text{(II)} \qquad \frac{\Delta f}{f^2}=\frac{\Delta a}{a^2}$$

obtained by differentiating equation I.

Figure 7:
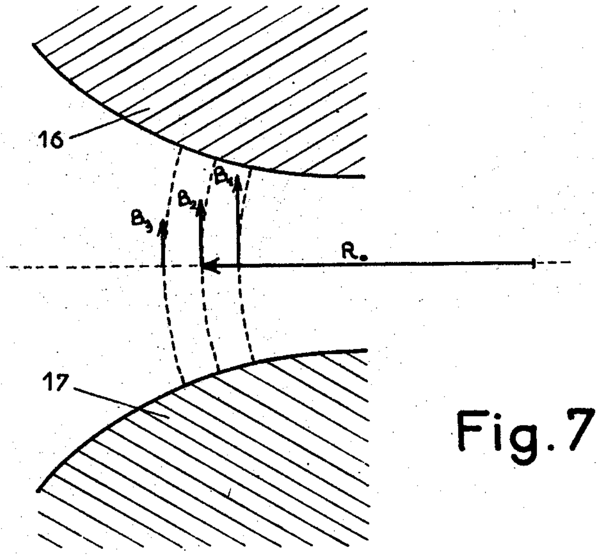

Now, the focal distance of the prism depends upon the derivative $$\frac{dB}{dR}$$

which represents the gradient of the field as a function of the radius. Fig. 7 is a transverse section of the magnet of a magnetic prism in which only the pole pieces 16 and 17 have been shown, the vacuum chamber being disposed between said pole pieces. The magnetic field depends upon the shape of these pole pieces. For instance, on Fig. 7, where their shape is such that they diverge toward the outside, the field decreases when the radius R of the orbit increases $$\left(\frac{dB}{dR}<0\right)$$

which has been represented by arrows $B_1$, $B_2$ and $B_3$ of decreasing magnitude.

The focal distance $f$ of a magnetic prism is given by the expression:

$$\text{(III)} \qquad f=\frac{R_0}{Q \sin Q \phi}$$

in which:

$R_0$=the radius of the mean orbit (fixed for a given prism),
$\varphi$=the angle of aperture of the prism (which is fixed for a given prism).

$$\text{(IV)} \qquad Q=\sqrt{1-n}$$

$$\text{(V)} \qquad n=-\frac{R_0}{B_0}\left(\frac{dB}{dR}\right)_0$$

In this last equation:

$B_0$ is the induction along the mean orbit, $$\left(\frac{dB}{dR}\right)_0$$

is the value of derivative $$\frac{dB}{dR}$$

taken on this mean 0 orbit,
$n$ will be hereinafter called "the index" of the field.

Figure 8:
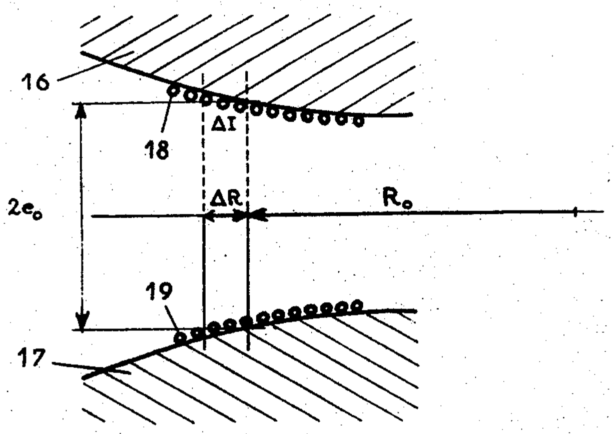

When the object moves a distance $\Delta a$, the collector being fixed, it is necessary to correct $f$ by an amount $\Delta f$ given by Equation II. This result is obtained by varying $$\left(\frac{dB}{dR}\right)_0$$

which involves, according to Equations V, IV and III, the variations of $n$, Q and $f$. The variation of $$\left(\frac{dB}{dR}\right)_0$$

is obtained practically by creating a supplementary magnetic field by applying, according to the invention, against the pole pieces 16 and 17, sheets of conductors 18 and 19 shown in section on Fig. 8. In the prior art, on the contrary, $$\left(\frac{dB}{dR}\right)_0$$

and consequently $n$ were fixed quantities for a given prism.

An extensive mathematical study of the problem shows that in the correcting windings 18 and 19 (Fig. 8) the currents must be of the same direction and that, $R_0$ being the radius of the mean orbit and $\Delta R$ the distance from the mean orbit measured along this radius, the linear current density $$K=\frac{\Delta I}{\Delta R}$$

to be made to flow through the windings along radius $R_0+\Delta R$ is given by the formula:

$$\text{(VI)} \qquad K=\frac{K_0}{\left(1-n\frac{\Delta R}{R_0}\right)^2}$$

with $$\text{(VII)} \qquad K_0=\frac{B_0 e_0}{\mu_0 R_0}\Delta n$$

in which $K_0$ is the linear density of current along radius $R_0$
$n$ "the index" of the field of the magnet,
$2e_0$ the height of the gap at the place corresponding to the radius $R_0$,
$\Delta n$ the increase of the index $n$ due to the correcting field,
$\mu_0$ the permeability of the vacuum equal to $4\pi.10^{-7}$ Georgi units The maximum value of the $\Delta a$ which is to be corrected being given, we successively deduce therefrom:

$\Delta f$ by Formula II,
$\Delta n$ by Formulae III and IV,
$K_0$ by formula VII.

In the particular case where $n=0$ (that is to say $$\left.\frac{dB}{dR}=0\right)$$

which means that the field is a uniform magnetic field created by parallel pole pieces, $K=K_0$.

In this case, the density K is the same everywhere.

In the case where $n\neq 0$, the conditions of Equation VI are practically complied with by taking for windings 18 and 19 (Fig. 8) a law of variation of the number N of conductors per unit of length along radius $R_0+\Delta R$ such that:

$$\text{(VIII)} \qquad N=\frac{N_0}{\left(1-n\frac{\Delta R}{R_0}\right)^2}$$

with $N_0 \cdot I=K_0'$ in which $N_0$ is the number of conductors per unit of length along the orbit of radius $R_0$, the same current I being passed through all the conductors.

As a matter of fact, this does not exclude the possibility of combinations between the number of conductors and the current intensity. The fact that the product $N_0.I$ is known is sufficient to make it possible practically to choose $N_0$ and I in the best conditions for having a gap as small as minimum.

Once the prism is made and the windings have been designed according to Formula VIII, a rheostat makes it possible to vary the intensity of the correcting current and experimentally to obtain a good focussing of the beam.

Figure 1:
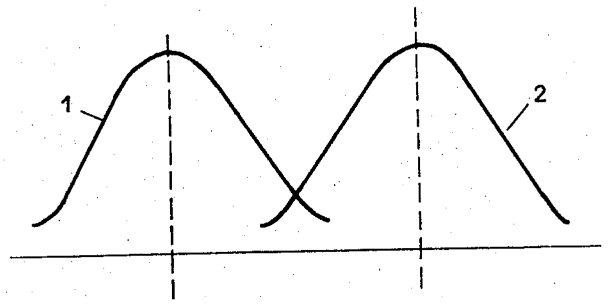
Figure 2:
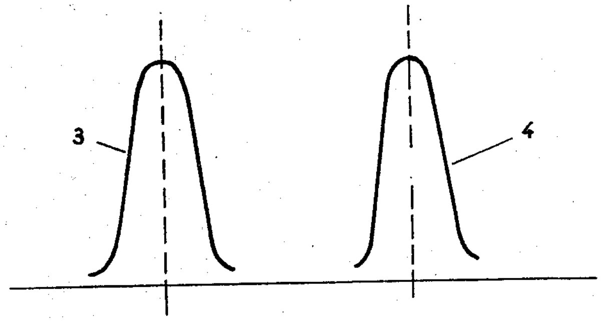
Figure 3:
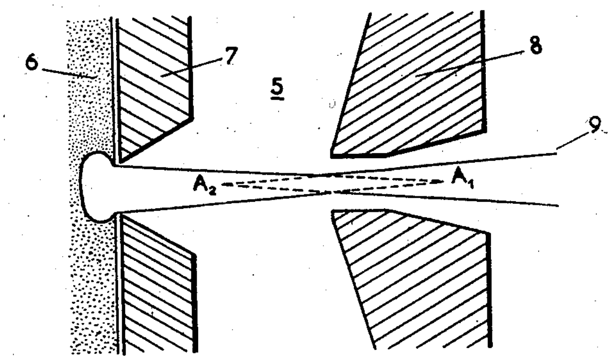
Figure 4:
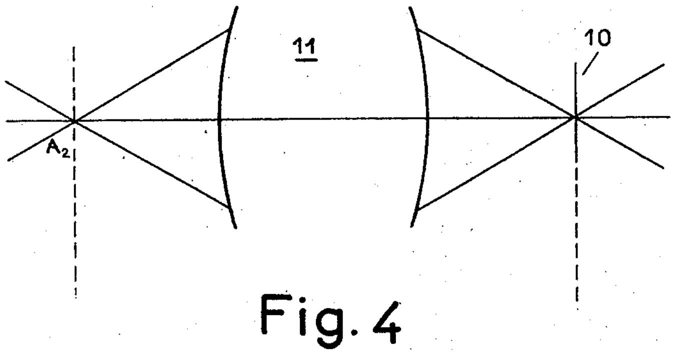
Figure 5:
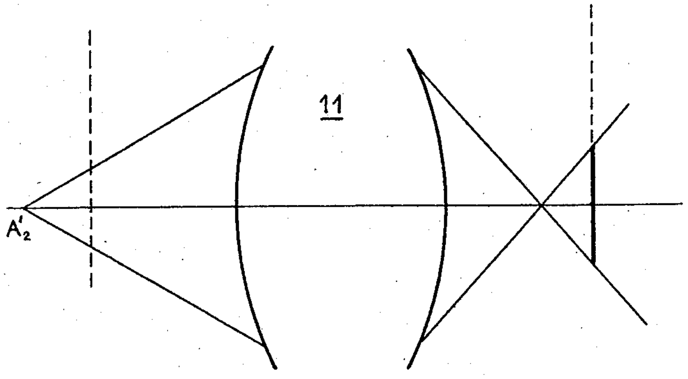
Figure 6:
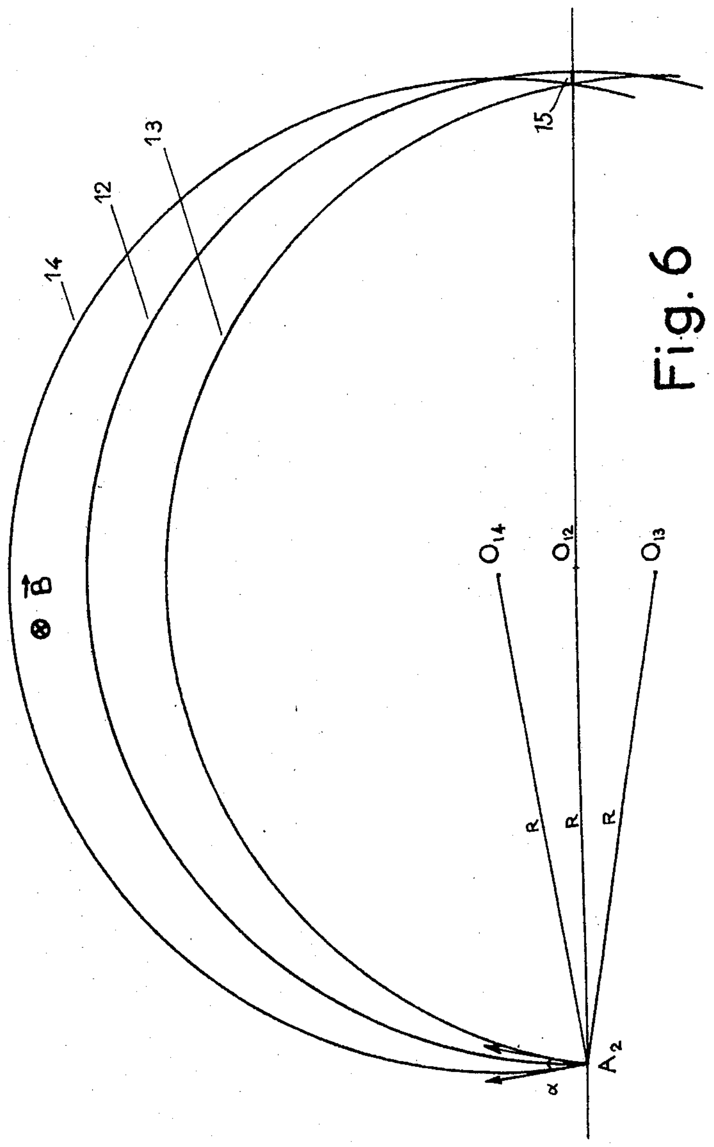
Figs. 6, 7 and 8 are diagrammatical views for explaining the features of the present invention.

Concerning now the coma aberration, it is known (Fig. 6) that the trajectories of the particles of the same characteristic are too much curved on either side of the mean trajectory. Calculation shows that it is necessary to act on the field on either side of this mean trajectory by a quadratic correction, that is to say that it is necessary to superimpose on the main induction an auxiliary induction of the form:

$$\text{(IX)} \qquad \Delta B = C(\Delta R)^2$$

C being a constant for a given prism.

The correction of the coma defect is then obtained, according to the invention, by means of a sheet of conductors distributed along the pole pieces.

Concerning the distribution of the currents in this sheet of correctors intended to correct the coma aberration, calculation leads to a linear density on either side of the mean orbit, given by the formula:

$$\text{(X)} \qquad K' = \xi \frac{B_0}{\mu_0} \cdot \frac{e_0}{R_0} \cdot \frac{\Delta R}{R_0} \cdot \frac{2 - n\frac{\Delta R}{R_0}}{\left(1 - n\frac{\Delta R}{R_0}\right)^2}$$

(where $\xi$ is a constant close to 1 for all prisms). Knowing the index $n$ of the field of the magnet that is used, we immediately deduce therefrom, by means of Equation X, the law of linear density of the current or, which is tantamount thereto, the law giving the number N' of conductors per unit of length along the radius $R_0 + \Delta R$ if the intensity I' in each conductor is supposed to be the same:

$$\text{(XI)} \qquad N' = \frac{K'}{I'} = \frac{\xi}{I'} \cdot \frac{B_0}{\mu_0} \cdot \frac{e_0}{R_0} \cdot \frac{\Delta R}{R_0} \cdot \frac{2 - n\frac{\Delta R}{R_0}}{\left(1 - n\frac{\Delta R}{R_0}\right)^2}$$

The number N of conductors to use per unit of length is known with the approximation of a proportionality factor which is close to 1, which permits of choosing, for the best possible results, the dimensions of the conductors as a function of the space available in the gap. The law of distribution of the conductors on the pole pieces is more complicated than in the case of the correction due to the displacements of the object but, on the other hand, it is permanent for a given prism. As in the case of the correction of the focal distance, a rheostat permits of experimentally adjusting the current to the optimum value for the correction.

Figure 9:
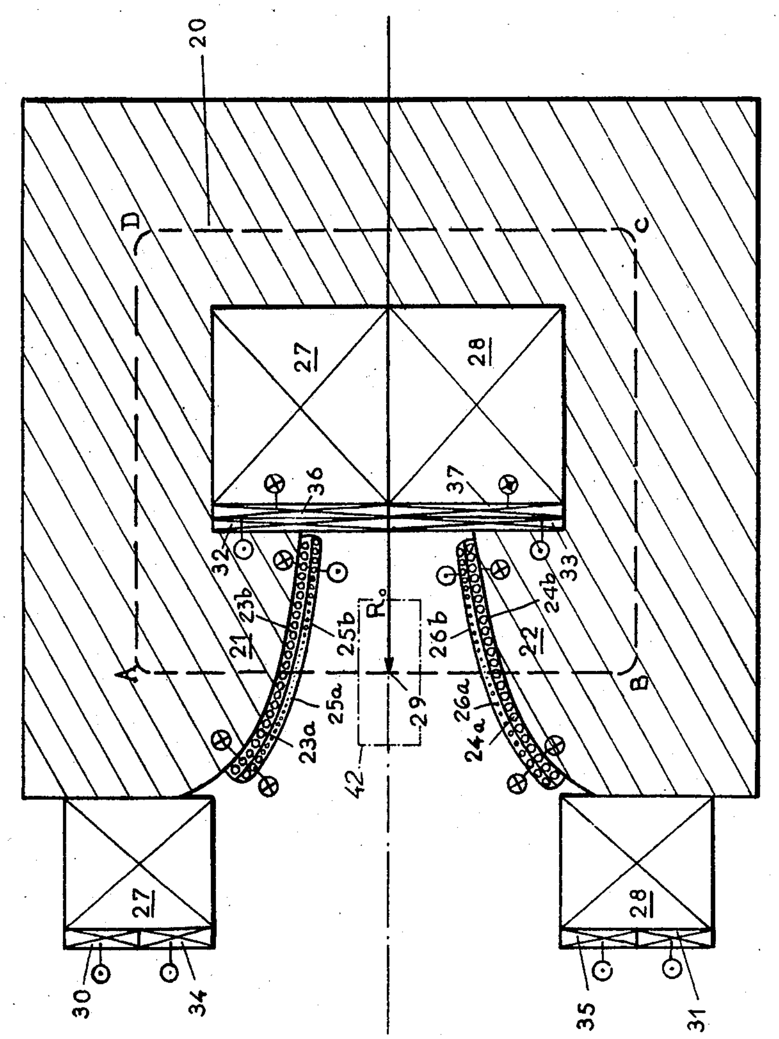
Figs. 9 and 10 are, respectively a sectional view and a detail view in perspective of an embodiment of a magnetic prism according to the present invention.
Figure 10:
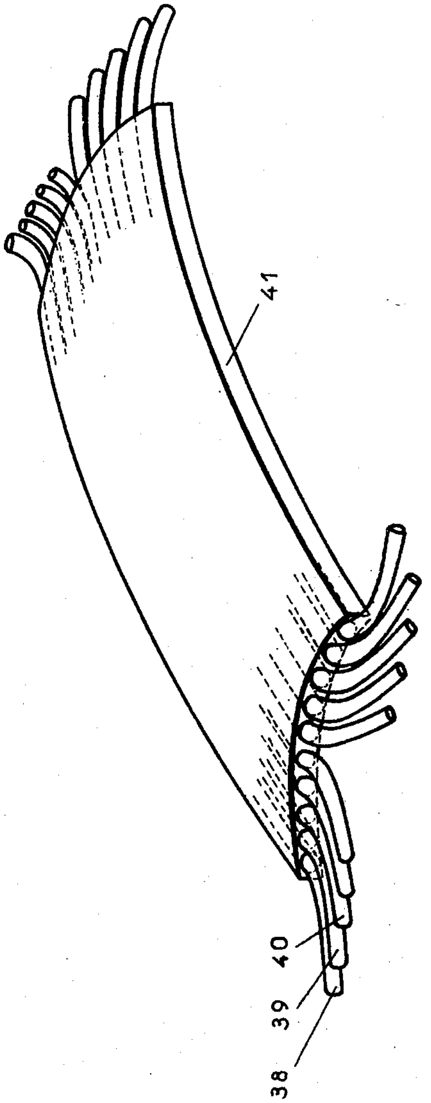

With reference to the appended Figs. 9 and 10, we will now describe an embodiment, given merely by way of example, of a magnetic prism according to our invention.

Fig. 9 is a section of the complete magnetic circuit of a magnetic prism the pole pieces of which are provided with windings for correcting the focal distance and the coma, according to the invention.

Fig. 10 is a detail view of a correcting winding.

In the preferred embodiment of the invention illustrated by Fig. 9, the focal distance correction windings and the coma correction windings are superimposed on each other.

We have shown on this Fig. 9 a section of a magnetic prism the core 20 of which is of C-shaped transverse section and of semi-circular longitudinal section. The vacuum chamber 42 is disposed between the pole pieces 21 and 22, these pole pieces being formed by the opposed faces of the C profile and being possibly constituted by added elements. The conventional magnetizing windings are disposed inside the C profile at 27 and 28 for each pole face respectively.

According to the invention, the surfaces of the pole pieces located opposite each other are covered with focal distance correcting windings 23 and 24 and coma correcting windings 25 and 26.

The mean orbit of radius $R_0$ cuts the plane of the drawing at point 29 and permits of dividing the space into two regions, one located toward the front of the prism (on the left hand side of line AB, Fig. 9), the other toward the rear (on the right hand side of line AB). This is very important because the returns of the correcting windings must comply with some conditions. The separation of these returns into those which close toward the front and those which close toward the rear must take place along the line AB corresponding to the mean trajectory. Otherwise the fields created by the correcting windings would not compensate for each other on the mean orbit 29, which would then be modified, and this is to be avoided.

We have shown at 30 and 31 (Fig. 9) the respective returns of the portions 23*a* and 24*a* of the focal distance correcting windings located on the left hand side of AB and at 32 and 33 the respective returns of the portions 23*b* and 24*b* of these windings located on the right hand side of AB.

In a likewise manner, the coma correcting windings have their returns at 34 and 35 (for the portions 25*a* and 26*a* of these windings located on the left hand side of AB) and at 36 and 37 (for the portions 25*b* and 26*b* of these windings located on the right hand side of AB).

The directions of the currents have been diagrammatically indicated near the windings by circles containing either a point (for one current direction) or a cross (for the opposed current direction). Each of these circles is connected by a lead line with the winding portion to which it corresponds. For the focal distance correcting windings, the directions are the same along the whole of the pole pieces. For the coma correcting windings, the directions are different on opposite sides of AB, the intensity being equal to zero on line AB on the mean orbit (Formula X). By applying the theorem of ampere along the closed line ABCD, it will be seen that the field created by the correcting windings 23*a*, 23*b*, 24*a*, 24*b*, 25*a*, 25*b*, 26*a*, 26*b*, and their returns 30, 32, 31, 33, 34, 36, 35, 37, is zero on the mean orbit 29. It suffices for this purpose to consider the correcting windings and their returns located on the inside of this line.

Fig. 10 shows a practical embodiment of the correcting windings used in the improved magnetic prisms according to the invention. Each winding is made of several conductors, such as 38, 39 and 40, embedded in an araldite envelope 41 conforming to the shape of the pole pieces of the electro-magnet which are not shown.

The invention is also applicable to the case of magnetic prisms having an alternate gradient, as described for instance in the U.S. patent application Ser. No. 608,-622 of September 7, 1956, filed by Henri Bruck for "Improvements Brought to Magnetic Prisms for Separating Ionized Particles." It is then advantageous to separate the correcting windings in the following manner: for instance, the focal distance correcting windings will be disposed on the two end prisms and the coma aberration correcting windings will be disposed on the central prism.

What we claim is:

1. A magnetic prism for separating the particles of a beam of ionized particles which comprises, in combination, an electro-magnet, said electro-magnet including a magnetic core in the form of a body having a plane of symmetry, the sections of said core by transverse planes passing through a line at right angles to said plane of symmetry being C-shaped, and the sections of said core by planes parallel to said plane of symmetry being in the form of circular arcs for the open portion of the C, so that this core is provided with a central recess of semi-circular section by said planes parallel to said plane of symmetry, the pole faces of said core, facing each other, on opposite sides respectively of said plane of symmetry, limiting between them a gap of general semi-circular shape, and main magnetizing windings disposed in said central recess longitudinally thereof, means forming an arcuate vacuum chamber in said gap for the beam of ionized particles, insulated conductors running side by side, on said pole faces, said conductors extending along semi-circular lines having their centers on said lines at right angles to said plane of symmetry, and means for passing through said conductors currents modifying the main magnetic field in such manner as to obtain an improved focussing of the ionized particles.

2. A magnetic prism according to claim 1 in which said last mentioned means are arranged in such manner that along a conductor of radius $R_0+\Delta R$ the current linear density K is equal to $$K=\frac{K_0}{\left(1-n\frac{\Delta R}{R_0}\right)^2}$$

with $$K_0=\frac{B_0 e_0}{\mu_0 R_0}\Delta n$$

$R_0$ being the radius of the mean orbit of the particles,
$\Delta R$ the difference between this radius $R_0$ and the radius of the orbit that is considered,
$K_0$ the linear density of the current along radius $R_0$,
$n$ the index of the magnet field,
$2e_0$ the height of the gap at the place of radius $R_0$,
$\Delta n$ the increase of the index due to the correcting field,
$\mu_0$ the permeability of vacuum.

3. A magnetic prism according to claim 2 in which said last mentioned means are arranged so as to pass the same current intensity through every conductor, the number of conductors N per unit of length in the transverse direction being equal to $$N=\frac{N_0}{\left(1-n\frac{\Delta R}{R_0}\right)^2}$$

$N_0$ being the number of conductors per unit of length along the radius $R_0$.

4. A magnetic prism according to claim 1 in which said last mentioned means are arranged in such manner that the linear density of the current K' flowing along the radius $R_0+\Delta R$ is equal to $$K'=\xi\frac{B_0}{\mu_0}\cdot\frac{e_0}{R_0}\cdot\frac{\Delta R}{R_0}\cdot\frac{2-n\frac{\Delta R}{R_0}}{\left(1-n\frac{\Delta R}{R_0}\right)^2}$$

$\xi$ being a constant close to 1 for all prisms,
$B_0$ the induction along the mean orbit,
$\mu_0$ the permeability of vacuum,
$2e_0$ the height of the gap at the place of radius $R_0$,
$R_0$ the radius of the mean orbit of particles,
$\Delta R$ the difference between this radius $R_0$ and the radius of the orbit that is considered, and
$n$ the index of the magnet field.

5. A magnetic prism according to claim 1 in which the portions of the correcting conductors disposed along the pole pieces of the magnet core include return conductors for successively connecting in series one of the correcting conductors with the next one, the correcting conductor portions and the return conductor portions being distributed in two groups separated from each other by the cylindrical surface generated by perpendiculars to the plane of symmetry of the magnet core passing through the mean orbit of the particles, the correcting conductors on one side of this surface being associated with return conductor portions located on said side of this surface.

References Cited in the file of this patent

UNITED STATES PATENTS 2,719,924 Oppenheimer et al. ------- Oct. 4, 1955